(12) United States Patent
Mai et al.

(10) Patent No.: US 8,200,434 B2
(45) Date of Patent: Jun. 12, 2012

(54) TSUNAMI DETECTION METHOD AND SYSTEM

(75) Inventors: Chao-Lun Mai, Taipei (TW); Jean-Fu Kiang, Taipei (TW)

(73) Assignee: National Taiwan University, Taipei (TW)

( * ) Notice: Subject to any disclaimer, the term of this patent is extended or adjusted under 35 U.S.C. 154(b) by 408 days.

(21) Appl. No.: 12/495,132

(22) Filed: Jun. 30, 2009

(65) Prior Publication Data
US 2010/0174488 A1    Jul. 8, 2010

(30) Foreign Application Priority Data
Jan. 8, 2009   (TW) .............................. 98100539 A

(51) Int. Cl.
*G01W 1/10*    (2006.01)
*G06F 19/00*   (2011.01)
(52) U.S. Cl. .............................. 702/3; 702/15; 701/215
(58) Field of Classification Search .................. 702/3, 2, 702/1, 15
See application file for complete search history.

(56) References Cited

U.S. PATENT DOCUMENTS

| 4,463,357 | A  | * | 7/1984  | MacDoran ................... 342/460 |
| 6,163,295 | A  | * | 12/2000 | Nagasamy et al. ...... 342/357.59 |
| 7,277,797 | B1 | * | 10/2007 | Kunitsyn et al. ................ 702/15 |
| 7,616,152 | B2 | * | 11/2009 | Terada et al. ............ 342/357.27 |
| 8,019,546 | B1 | * | 9/2011  | Osburn, III ....................... 702/3 |
| 2006/0195263 | A1 | * | 8/2006 | Meinig et al. ..................... 702/3 |
| 2009/0286505 | A1 | * | 11/2009 | Kirk ........................... 455/404.2 |

* cited by examiner

*Primary Examiner* — Hal Wachsman

(57) ABSTRACT

A method of detecting a tsunami by using the global positioning system (GPS) is provided. The method includes distributing multiple GPS receivers over a sea surface in a target area, receiving signals from GPS satellites by the GPS receivers, and transmitting the signals and coordinates of the GPS receivers to a computer. The signals are then processed to acquire real-time monitoring data including the distribution of electrons in the ionosphere above the target area, and the occurrence of a tsunami is then determined based on the distribution of electrons.

20 Claims, 5 Drawing Sheets

TSUNAMI DETECTION METHOD AND SYSTEM

FIELD OF THE INVENTION

The present invention relates to a tsunami detection method and system, and more particularly to a tsunami detection method and system by using the global positioning system and technique of computerized tomography.

BACKGROUND OF THE INVENTION

Tsunami, a devastating wave having enormously destructive power, causes nearly unrecoverable loss for the islands and the cities along the coast that are destroyed by its frightening force. Therefore, there has long been an effort to construct a sound tsunami alert system and to increase the alert time as long as possible before the tsunami reaches land in order to provide the public sufficient time to prepare in order to reduce the number of casualties and loss of property. The 2004 Sumatra Tsunami disaster was the biggest in scale and caused the highest number of casualties in recorded history.

The features of tsunami are the extremely long wavelength and the very fast propagation speed, which are about 200 km and 600 km per hour, respectively. Besides, the amplitude of tsunami in the deep ocean is about one meter only, so that it is hard to be noticed and detected. In the global sea level observing system (GLOSS), tide gauges are deployed along the coast or around the islands to monitor the sea level to detect possible occurrence of tsunami. Additionally, in the deep-ocean assessment and reporting of tsunami system (DART), sensors are anchored on the sea floor and connected to the buoy on the sea surface, and the data collected from both are transmitted from the buoy to the satellite and then to the central station. When a shockwave of the sea floor or a wavefront of the tsunami passes through the sensor or the buoy, it is possible to detect whether a tsunami or an earthquake occurs.

However, it is always too late to sense the coming of the tsunami via the above methods, and inhabitants along the coast still do not have sufficient time to evacuate. Besides, the cost to build, configure and maintain these equipments is highly expensive.

After the disaster of the 2004 Sumatra Tsunami, scientists discovered that there is strong and irregular variation in the ionosphere when an earthquake or a tsunami happens. This is because the acoustic waves and gravity waves caused by tsunami will propagate upward into the ionosphere, which results in the variation of electron density. Such variation occurs immediately after the tsunami passes through. Therefore, measurement and observation on the total electron content of the ionosphere is an effective way to detect whether a tsunami occurs.

Presently, techniques of using satellites to measure the electron density in the ionosphere have been proposed. The National Aeronautics and Space Administration (NASA) has demonstrated a global differential GPS (GDGPS) system, wherein the real-time global maps of ionospheric electron density can be generated per five minutes. Moreover, the Jet Propulsion Laboratory (JPL) uses the data collected from land stations all over the world to generate real-time global maps of ionospheric total electron content per five minutes, and provides them to the single-frequency GPS users. In addition, there are many organizations, institutions and network systems which can provide data collected from GPS for extensive scientific applications, such as International GPS Service (IGS), Japan GPS Earth Observation Network System (GEONET), Center for Orbit Determination in Europe (CODE) and US NOAA Space Environment Center, etc.

Possible factors to cause perturbation of electron density include season change, sunspot activities, geomagnetic storm, man-made atmospheric pollution, as well as earthquakes and tsunamis mentioned above. By using the International Reference Ionosphere (IRI) model, the perturbation of ionosphere under normal condition can be inferred, thus various kinds of irregularities of ionosphere can be forecasted reliably. In addition to the man-made factors, however, after the atmospheric gravity waves generated by tsunami propagate to the ionosphere, the reconstructed image of variation of electron density thereof through computer simulation will show different features from those under normal condition.

In order to overcome the drawbacks in the prior art, a tsunami detection method and system are provided. The particular designs in the present invention not only solve the problems described above, but also are easy to be implemented. Thus, the present invention has the utility for the industry and the government.

SUMMARY OF THE INVENTION

In accordance with an aspect of the present invention, a tsunami detection method and system are provided, which increase the alert time before a tsunami raid and the alert accuracy in a cost effective, environmentally friendly and economical way.

In accordance with another aspect of the present invention, a method of detecting a tsunami by using a global positioning system (GPS) is provided. The method comprises steps of distributing a plurality of GPS receivers over the sea surface in a target area; receiving signals from GPS satellites by the plurality of GPS receivers, and transmitting the signals and coordinates of the plurality of GPS receivers to a computer; processing the signals to acquire a real-time monitoring data of the ionosphere, wherein the real-time monitoring data includes a distribution of electrons in the ionosphere above the target area; and determining an occurrence of the tsunami based on the distribution of the electrons.

Preferably, the signals are processed by applying a computerized tomography technique.

Preferably, the electrons in the ionosphere above the target area are mainly distributed in an altitude ranging from 200 km to 250 km.

Preferably, the step of distributing a plurality of GPS receivers further comprises a sub-step of distributing the plurality of GPS receivers by using a motion of an ocean current in order to spread the GPS receivers over the target area.

Preferably, the step of distributing the plurality of GPS receivers by using a motion of an ocean current further comprises a sub-step of fixing each of the GPS receivers to a body drifting on the sea surface for preventing the GPS receivers from sinking.

Preferably, the step of distributing a plurality of GPS receivers further comprises at least one step of distributing another plurality of GPS receivers along the coast; and distributing another plurality of GPS receivers in land.

Preferably, the step of processing the signals further comprises sub-steps of dividing the ionosphere above the target area into a plurality of voxels; and calculating the average electron density within each voxel to acquire a total electron content above the target area.

Preferably, the step of determining the occurrence of tsunami further comprises a sub-step of comparing the monitoring data with a historical data stored in a data base of the computer.

Preferably, the step of determining the occurrence of tsunami is performed by reconstructing an image of the distribution of electrons in the ionosphere, and the tsunami is determined based on one of concentrically ring-shaped feature appearing in the image.

Preferably, the method further comprises a step of announcing an alert to a dangerous region when the occurrence of a tsunami is determined.

Preferably, the method further comprises a step of repeating the step of receiving signals to the step of announcing an alert after a predetermined period.

In accordance with a further aspect of the present invention, a system of detecting a tsunami by using the global positioning system (GPS) is provided. The system comprises a plurality of GPS receivers distributed over a sea surface in a target area, and receiving signals transmitted from GPS satellites; and a computer receiving the signals transmitted from GPS receivers, and processing the signals to acquire real-time monitoring data of the ionosphere, wherein the monitoring data comprise a distribution of electrons in the ionosphere above the target area, which are used to reconstruct an image, so as to determine the occurrence of a tsunami based on the image.

Preferably, the signals are processed by applying a computerized tomography technique, and the electrons in the ionosphere above the target area are mainly distributed in the altitude ranging from 200 km to 250 km.

Preferably, the plurality of GPS receivers are distributed by using the motion of an ocean current in order to spread the GPS receivers over the target area.

Preferably, each of the GPS receivers is fixed to a body drifting on the sea surface to prevent the GPS receivers from sinking.

Preferably, the system further comprises at least another plurality of GPS receivers distributed along coasts and another plurality of GPS receivers distributed in land.

Preferably, the computer comprises a database to store the background information and the historical record of electron density of the ionosphere above the target area.

Preferably, the computer announces an alert to a dangerous region when the occurrence of a tsunami is determined based on the image of the distribution of electrons reconstructed with computer.

Preferably, the tsunami is determined based on concentrically ring-shaped features appearing in the image.

In accordance with another aspect of the present invention, a method of detecting a tsunami by using the global positioning system (GPS) is provided. The method comprises steps of distributing a plurality of GPS receivers over the surface of a target area; receiving signals from the GPS satellites by the plurality of GPS receivers, and transmitting the signals and coordinates of the plurality of GPS receivers to a computer; processing the signals to reconstruct an image of the distribution of electrons in the ionosphere above the target area, wherein the image includes concentrically ring-shaped features; and determining the occurrence of a tsunami based on the image.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
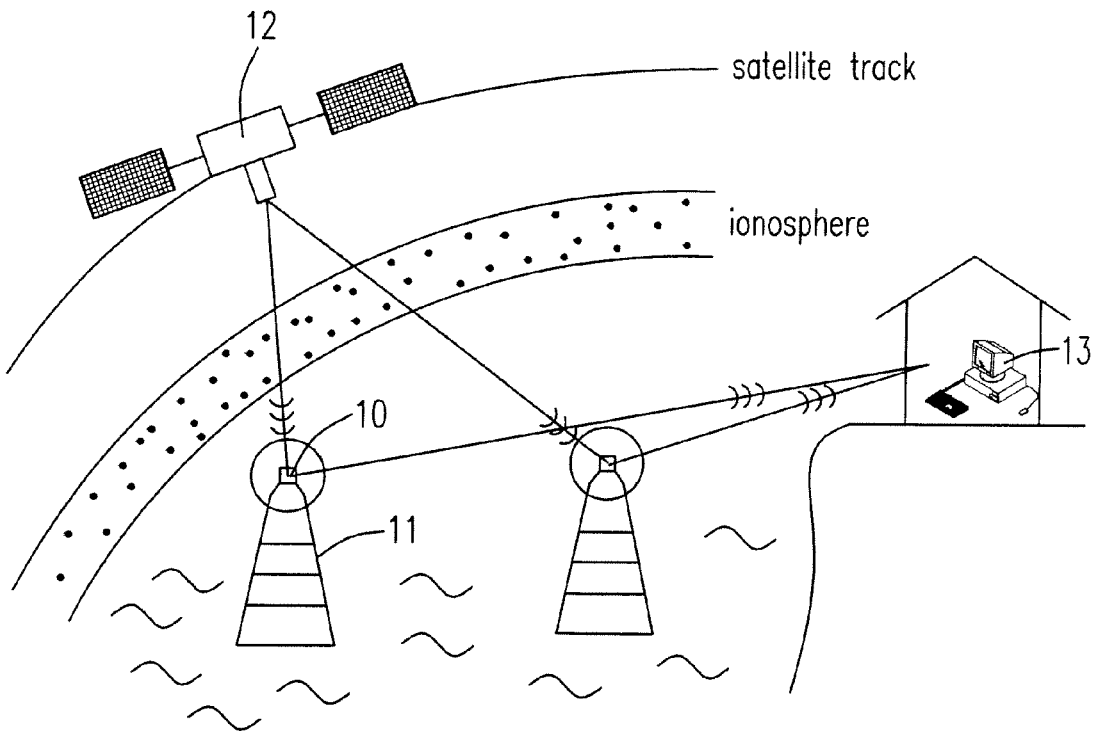
FIG. 1 is a schematic diagram of the tsunami detection system in the present invention.

Please refer to FIG. 1, which is a schematic diagram of the tsunami detection system in the present invention. The system comprises a plurality of GPS receivers 10, which are distributed over the ocean surface and fixed to a carrying body 11 that can drift on the sea. The ways of distribution include air drop, ship carrying or simply throwing from the coast, so that the GPS receivers 10 can spread over the entire sea area gradually with the motion of ocean currents to form a GPS receiver network. Each of the GPS receivers 10 will receive the signals transmitted from GPS satellites 12 continuously in all-weather, and transmit the signals and the coordinates of receiver itself to a computer 13 of the rear alert center. Because of the phase delay induced when the signals pass through the ionosphere, by applying the technique of computerized tomography, the computer 13 could calculate the distribution and perturbation of electrons in the ionosphere above the sea area on which the GPS receivers 10 have been distributed.

The definition of total electron content (TEC) is the line integration of electron density along one of the propagation paths of electromagnetic wave. The propagation path of electromagnetic wave starts from the location of the satellite to that of the GPS receiver. The formula is as follows:

$$TEC = \int_l Ne(s) ds \quad (1)$$

where Ne(s) is the electron density at location s, and l is the propagation path of the electromagnetic wave.

To calculate the electron density distribution of the ionosphere above the sea area containing the distributed GPS receivers, the ionosphere above the target area is divided into N voxels $\{V_n\}$. Let $f(\bar{r})$ be the electron density at $\bar{r}$, which is approximated by a set of N local basis functions, with one basis function in one voxel, as $$f(\bar{r}) \cong \sum_{n=1}^{N} x_n b_n(\bar{r}) \quad (2)$$

where $x_n$ is the average electron density in the nth voxel Vn, and $$b_n(\bar{r}) = \begin{cases} 1, & \text{if } \bar{r} \text{ is inside } V_n \\ 0, & \text{otherwise} \end{cases} \quad (3)$$

Assume there are I satellites with the ith satellite located at $S^i$, and J receivers with the jth receiver located Rj, and the data are collected at M time instants. Let $y_j^{im}$ be the measured TEC from satellite i located at $S^i$ to receiver j located at Rj, therefore $y_j^{im}$ is the line integration of $f(\bar{r})$ along the path $l_j^{im}$ as $$y_j^{im} = \int_{l_j^{im}} f(\bar{r}) ds \quad (4)$$

where $1 \leq i \leq I$, $1 \leq j \leq J$, $1 \leq m \leq M$. Therefore by substituting formula (2) into (4), we have $$y_j^{im} \cong \sum_{n=1}^{N} Z_{jn}^{im} x_n, \text{ wherein } Z_{jn}^{im} = \int_{l_j^{im}} b_n(\bar{r}) ds \quad (5)$$

where $Z_{jn}^{im}$ is the path length of $l_j^{im}$ within voxels Vn. As a result, formula (5) can be put in a matrix form as $$\bar{Y} \cong \bar{Z} \cdot \bar{X} \quad (6)$$

Finally, to obtain the solution $\bar{X}$, which is the electron density distribution in the ionosphere above the target area, there are several calculation methods such as algebraic reconstruction technique (ART), simultaneous iterative reconstruction technique (SIRT), and multiplicative algebraic reconstruction technique (MART), etc.

Figure 2:
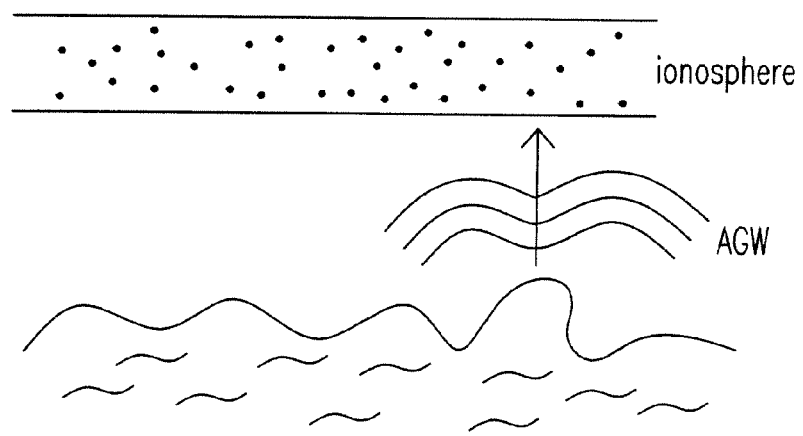
FIG. 2 shows the atmospheric gravity wave induced by the tsunami.

Please refer to FIG. 2, which shows the atmospheric gravity wave induced by the tsunami propagating on the sea surface. Tsunami is a surface gravity wave propagating on the water surface, which causes atmospheric gravity waves (AGWs) in the atmosphere, which propagate upward to the ionosphere. Though the occurrence of a tsunami is induced by an earthquake, yet compared with acoustic waves induced by an earthquake or sea waves in normal cases, tsunami-induced AGWs possess larger energy because the entire sea surface will be affected to form continuous surface waves. Therefore when the AGWs propagate to the ionosphere, the perturbation of electron density caused therefrom is extremely obvious, and the horizontal propagation velocity, wavelength and waveform of the AGWs are close to that of tsunami, thus exhibiting in the ionosphere the effect of AGWs. In order to monitor the affected ionosphere efficiently, distributing the GPS receiver network over the open sea will be the best manner so that the alert time of tsunami can be extended.

Subsequently, the 2004 Sumatra Tsunami is taken as an example to explain the application scopes and model construction of the present invention.

Figure 3:
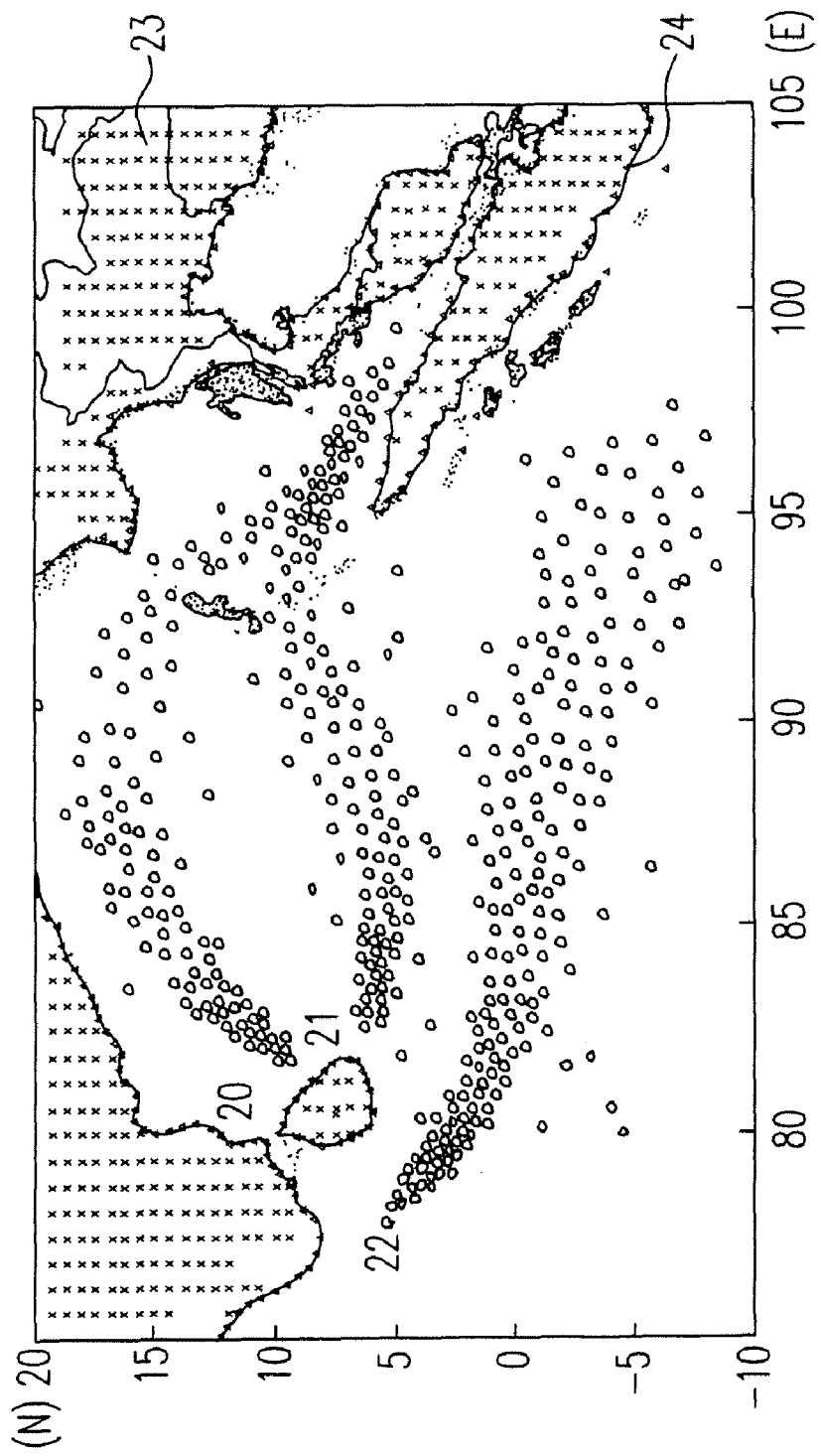
FIG. 3 shows the GPS receiver network distributed according to a preferred embodiment of the present invention.

Please refer to FIG. 3, which shows the GPS receiver network distribution according to a preferred embodiment of the present invention. The GPS receiver network distribution includes the GPS receiver networks 20, 21 and 22 distributed on the sea surface and separated to three groups 20, 21 and 22 with the motion of ocean currents, the GPS receiver network 23 distributed on the land, and the GPS receiver network 24 distributed along the coast. Since the GPS receiver networks of the present invention can be distributed along the coast or in land, when cooperating with the GPS receivers on the sea surface, the data can be transmitted all together to the computer to be processed, so that a more precise image can be obtained when reconstructing the image.

In addition, there are many factors to cause traveling ionospheric disturbances (TIDs) phenomena such as natural wind or earthquake-induced acoustic waves, and these TIDs not induced by the tsunami would affect the accuracy when monitoring on the target region. The GPS receiver network distributed on the land 23 would be helpful for analysis and identification, thereby reducing the possibility of false alarm. Basically, according to the data obtained from only the GPS receiver networks 20, 21 and 22 to conduct image reconstruction, there still is high accuracy enough to identify the difference between tsunamis and other disturbances.

Figure 4:
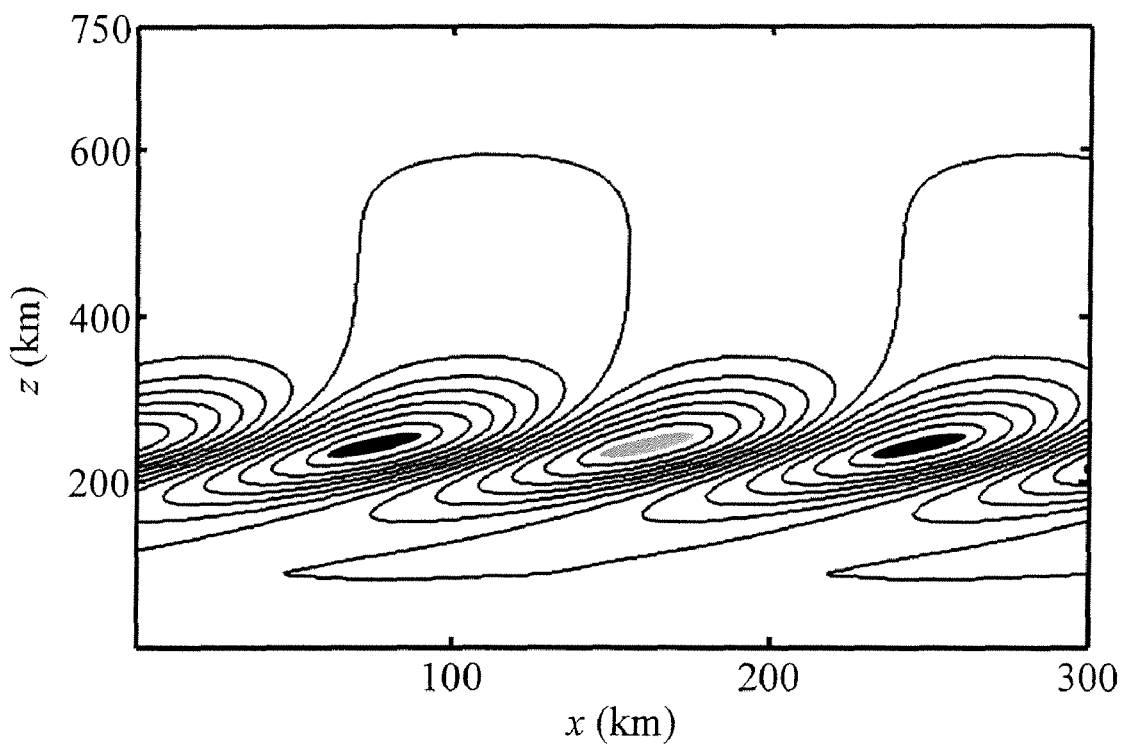
FIG. 4 shows the distribution of electron density perturbation according to a preferred embodiment of the present invention.
Figure 5A:
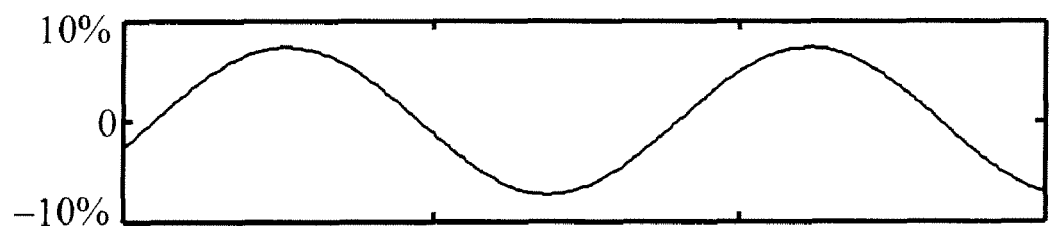
FIG. 5(a) shows the total electron content (TEC) percentage variation according to a preferred embodiment of the present invention.
Figure 5B:
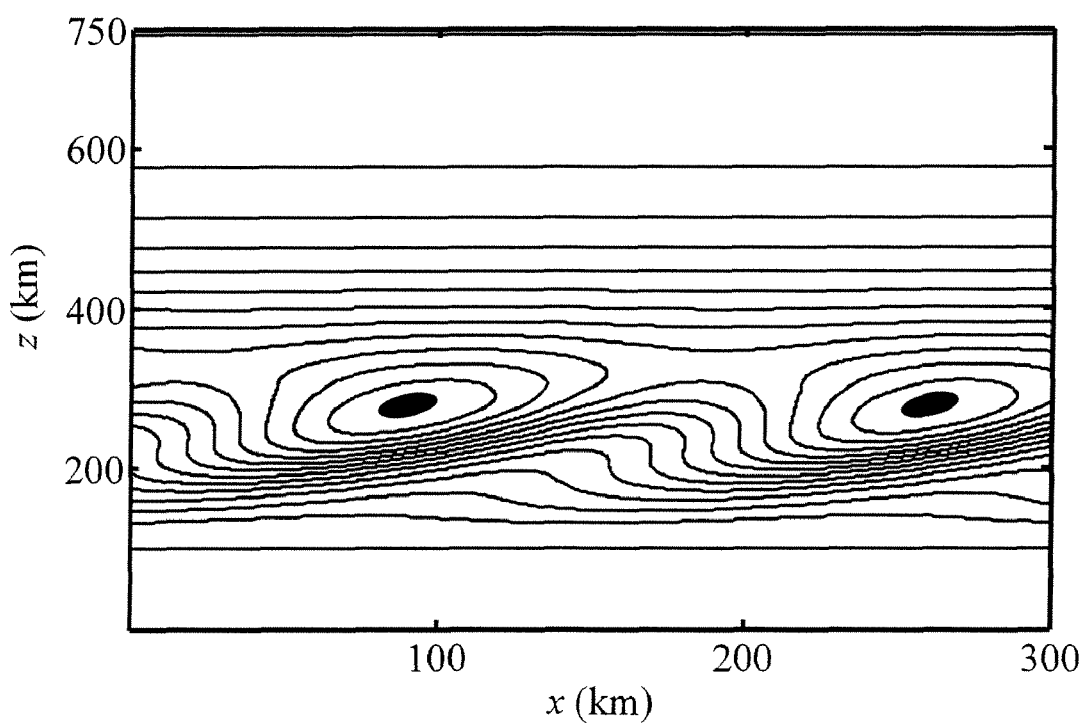
FIG. 5(b) shows the distribution of total electron density according to a preferred embodiment of the present invention.

Please refer to FIG. 4, which shows the distribution (e/m³) of electron density (Né) perturbation. Next please refer to FIGS. 5(a) and 5(b), which show the TEC percentage variation and the distribution of total electron density, respectively. It is known that the most apparent variation takes place at an altitude of about 100 km to 600 km, especially 200 km to 250 km, and FIG. 5(a) also shows that the wavelength is 173 km, which is approximately equal to the wavelength of tsunami. By reconstructing the distribution of electron density perturbation in the ionosphere above the target area, the possibility of tsunami occurrence can be known due to the abnormality induced by the tsunami, which is special and obvious, when monitoring the ionosphere above the target area.

Figure 6A:
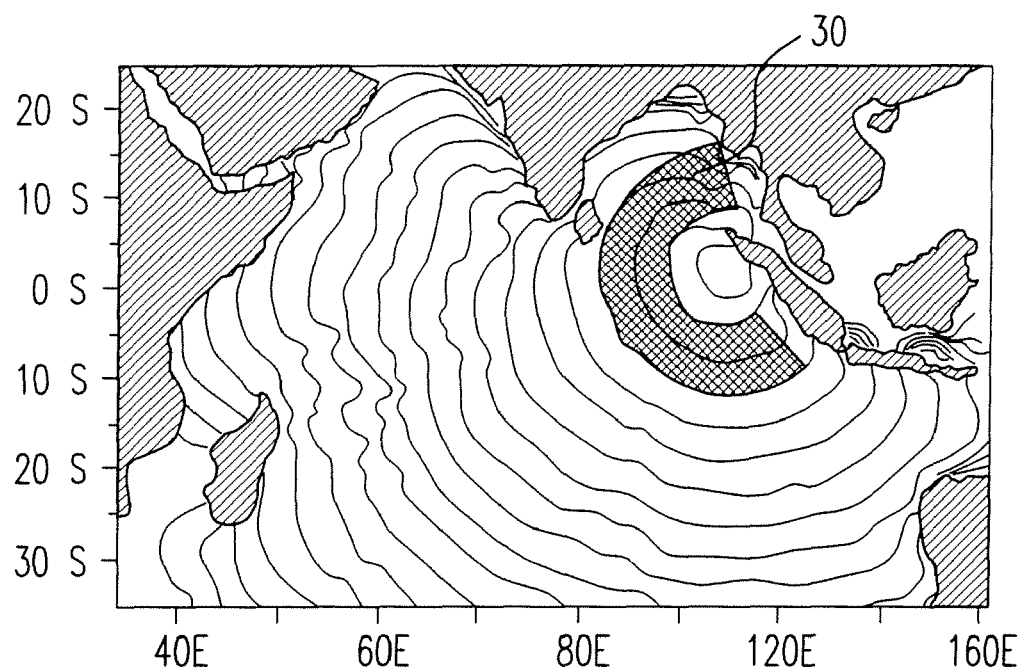
FIG. 6(a) shows the tsunami wavefront according to a preferred embodiment of the present invention.
Figure 6B:
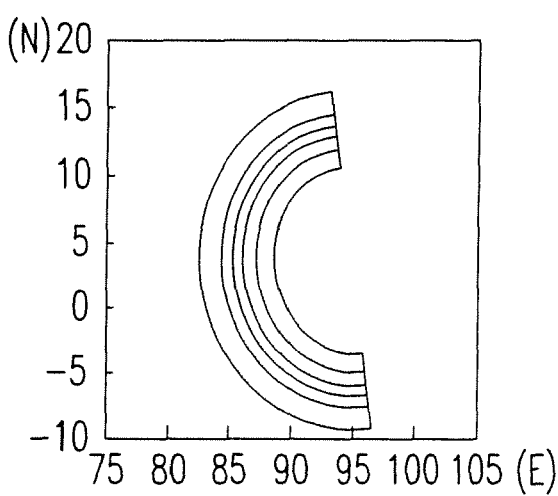
FIG. 6(b) shows the computer-simulated image according to a preferred embodiment of the present invention (at an altitude of 250 km).

Please refer to FIGS. 6(a) and 6(b), which show the tsunami wavefront and the computer-reconstructed image at an altitude of 250 km, respectively, wherein FIG. 6(b) is the simulation image of electron density perturbation above the target area 30 in FIG. 6(a). The computer will reconstruct an image when receiving the data transmitted from the GPS receivers and calculating the electron density distribution of the ionosphere above the target area. It is clearly shown from the image that the computer-reconstructed image presents concentrically ring-shaped features. This kind of rippling features totally exhibits the evidence that the waveform of a tsunami is spreading from the epicenter. Therefore, once such simulated result comes up, it is an indication that a tsunami appears in the target area. At this moment, announcing the alert immediately to the coast where tsunami could possibly strike can effectively prevent the disaster, especially the loss of lives.

As to reconstructing a simulated image, the International Geomagnetic Reference Filed (IGRF), the Mass Spectrometer Incoherent Scatter (MSIS) model and the IRI can be the reference materials of the atmospheric background parameters. Based on these models, the background variation in the atmosphere at different times can be estimated. By combining these data to reconstruct the image, it will be clearer to identify whether the features shown indicate abnormality, certain existing phenomena or signs related to the occurrence of a tsunami.

In addition, applying the data acquired from other Global Navigation Satellite Systems (GNSS) to enforce the present invention can obtain a better result, such as the GLONASS of Russian Federation, the Galileo System of European Union under construction, the Compass system (also known as Beidou-2) of China and the Indian Regional Navigational Satellite System (IRNSS) of India, etc.

Above all, the propagation speed of AGW to the ionosphere is very fast, which takes merely about 13 minutes, so that the satellites that continuously move around the Earth can transmit signals in a very short period of time, and the time required for the computer to conduct calculation and image reconstruction is very short as well. As a result, using GPS to monitor the target region to evaluate whether a tsunami occurs can achieve almost real-time action and response.

Besides, the GPS receiver network distributed on the open sea is unlike the equipment of the coastal GLOSS system that is easy to be damaged by waves, and is also different from the buoy station in the DART system with expensive manufacturing and constructing costs. Therefore, the tsunami early-stage alert system provided by the present invention possesses the advantages of lower costs.

While the invention has been described in terms of what is presently considered to be the most practical and preferred embodiment, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method of detecting a tsunami by using a global positioning system (GPS), comprising the steps of:
   (a) distributing a plurality of GPS receivers over a sea surface in a target area;
   (b) transmitting a plurality of first signals from GPS satellites through an ionosphere above the target area to each of the plurality of GPS receivers such that each of the plurality of GPS receivers has a coordinate generated respectively by each of the plurality of GPS receivers, and transmitting a plurality of second signals and the coordinates of the plurality of GPS receivers to a computer;
   (c) processing the second signals to acquire a real-time monitoring data indicating a distribution of electrons in a portion of the ionosphere disposed above the target area; and
   (d) determining an occurrence of the tsunami by identifying a perturbation of electron density caused by the tsunami based on the distribution of the electrons provided by the real-time monitoring data.

2. The method according to claim 1, wherein the second signals are processed by applying a computerized tomography technique.

3. The method according to claim 1, wherein the electrons in the ionosphere above the target area are mainly distributed in an altitude ranging from 200 km to 250 km.

4. The method according to claim 1, wherein the step (a) further comprises a sub-step of:
   (a1) distributing the plurality of GPS receivers by using a motion of an ocean current in order to spread the GPS receivers over the target area.

5. The method according to claim 4, wherein the step (a1) further comprises a sub-step of:
   (a11) fixing each of the GPS receivers to a body drifting on the sea surface to prevent the GPS receivers from sinking.

6. The method according to claim 4, wherein the step (a) further comprises at least one step of:
   (a2) distributing another plurality of GPS receivers along a coast; and
   (a3) distributing another plurality of GPS receivers over land.

7. The method according to claim 1, wherein the step (c) further comprises sub-steps of:
   (c1) dividing the ionosphere above the target area into a plurality of voxels; and
   (c2) calculating an average electron density within each voxel to acquire a total electron content above the target area.

8. The method according to claim 1, wherein the step (d) further comprises a sub-step of:
   (d1) comparing the real-time monitoring data with a historical data stored in a data base of the computer.

9. The method according to claim 1, wherein the step (d) is performed by reconstructing an image of the distribution of the electrons in the ionosphere, and the tsunami is determined based on concentrically ring-shaped features shown in the image.

10. The method according to claim 1, further comprising a step of:
    (e) announcing an alert to a dangerous region when the occurrence of the tsunami is determined.

11. The method according to claim 10, further comprising a step of:
    (f) repeating steps (b) to (e) after a predetermined period.

12. A system of detecting a tsunami by using a global positioning system (GPS), comprising:
    a plurality of GPS receivers distributed over a sea surface in a target area, and receiving a plurality of first signals transmitted from a GPS satellite through an ionosphere above the target area to each of the plurality of GPS receivers; and
    a computer receiving a plurality of second signals transmitted from the plurality of GPS receivers, and processing the second signals to acquire a real-time monitoring data indicating a distribution of electrons in a portion of the ionosphere disposed above the target area, which is used to reconstruct an image, so as to determine an occurrence of the tsunami by identifying a perturbation of electron density caused by the tsunami based on the image.

13. The system according to claim 12, wherein the second signals are processed by applying a computerized tomography technique, and the electrons in the ionosphere above the target area are mainly distributed in altitude ranging from 200 km to 250 km.

14. The system according to claim 12, wherein the plurality of GPS receivers are distributed by using a motion of an ocean current in order to spread the plurality of GPS receivers over the target area.

15. The system according to claim 14, wherein each of the GPS receivers is fixed to a body drifting on the sea surface to prevent the GPS receivers from sinking.

16. The system according to claim 14, further comprising another plurality of GPS receivers including:
    at least a first GPS receiver distributed along a coast; at least a second GPS receiver distributed over land.

17. The system according to claim 12, wherein the computer comprises a data base to store a background information and a historical record of an electron density of the ionosphere above the target area.

18. The system according to claim 12, wherein the computer announces an alert to a dangerous region when the occurrence of the tsunami is determined based on an image of the distribution of electrons reconstructed with the computer.

19. The system according to claim 18, wherein the tsunami is determined based on concentrically ring-shaped features shown in the image.

20. A method of detecting a tsunami by using a global positioning system (GPS), comprising the steps of:
    (a) distributing a plurality of GPS receivers over a surface of a target area;
    (b) transmitting a plurality of first signals from a plurality of GPS satellites through an ionosphere above the target area to each of the plurality of GPS receivers such that each of the plurality of the GPS receivers has a coordinate generated respectively by each of the plurality of GPS receivers, and transmitting a plurality of second signals and the coordinates of the plurality of GPS receivers to a computer;

(c) processing the second signals to reconstruct an image of a distribution of the electrons in an ionosphere above the target area, wherein the image includes concentrically ring-shaped features; and (d) determining an occurrence of the tsunami by identifying a perturbation of electron density caused by the tsunami based on the image.

* * * * *